US012664585B2

(12) United States Patent
Konduru et al.

(10) Patent No.:   US 12,664,585 B2
(45) Date of Patent:       Jun. 23, 2026

(54) DETERMINISTIC MESSAGE PROCESSING IN A DISTRIBUTED NETWORK

(71) Applicant: Chicago Mercantile Exchange Inc., Chicago, IL (US)

(72) Inventors: Dileep Chakravarthi Konduru, Schaumburg, IL (US); Zachary Bonig, Skokie, IL (US); Frank Kmiec, Carey, IL (US); Ari L. Studnitzer, Northbrook, IL (US); Manmathasivaram Nagarajan, Chicago, IL (US); Priteshkumar Soni, Naperville, IL (US); Pearce Ian Peck-Walden, Chicago, IL (US); James Allen Bailey, Western Springs, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 593 days.

(21) Appl. No.: 16/446,469

(22) Filed: Jun. 19, 2019

(65) Prior Publication Data

US 2020/0402170 A1      Dec. 24, 2020

(51) Int. Cl.
*G06Q 40/04*       (2012.01)
*H04L 67/10*       (2022.01)

(52) U.S. Cl.
CPC ............. *G06Q 40/04* (2013.01); *H04L 67/10* (2013.01)

(58) Field of Classification Search
CPC ................................ G06Q 40/04; H04L 67/10
(Continued)

(56) References Cited

U.S. PATENT DOCUMENTS 7,788,163 B2      8/2010   Troxel, Jr.
8,082,206 B2    12/2011   Troxel, Jr.
(Continued)

FOREIGN PATENT DOCUMENTS

WO          2014043420 A1      3/2014
WO      WO-2015185563 A1 * 12/2015     ............. G06Q 40/04
WO          2017117191 A1      7/2017

OTHER PUBLICATIONS

"Will Kenton, "What Is an Order Book? Definition, How It Works, and Key Parts", Oct. 10, 2022, Investopedia," (Year: 2022).*
(Continued)

*Primary Examiner* — Ryan D Donlon
*Assistant Examiner* — Gregory M James
(74) *Attorney, Agent, or Firm* — Lempia Summerfield Katz LLC

(57)            ABSTRACT

Message processing is described, in which each of first and second computer systems have a message operator configured to process messages to manage a data structure having a state determined via the processing. The message operator of the first computer system is configured to reroute unprocessed messages to the message operator of the second computer system such that the message operator of the second computer system establishes an order of an input message stream and a current state of the data structure arising from the input message stream. The message operator of the second computer system is configured to, once the current state is established, send the messages of the input message stream to the message operator of the first computer system in accordance with the established order such that the current state of data structure is recreated by the message operator of the first computer system.

20 Claims, 4 Drawing Sheets

(58) Field of Classification Search
USPC ........................................................ 705/37
See application file for complete search history.

(56) References Cited

U.S. PATENT DOCUMENTS

| | | | | |
|---|---|---|---|---|
| 8,296,217 | B1* | 10/2012 | Howorka | G06Q 40/06 |
| | | | | 705/37 |
| 8,768,821 | B1* | 7/2014 | Elston | G06Q 40/06 |
| | | | | 705/37 |
| 9,691,102 | B2 | 6/2017 | Studnitzer | |
| 10,102,577 | B2 | 10/2018 | Merold | |
| 10,140,656 | B2* | 11/2018 | Waelbroeck | G06Q 40/00 |
| 10,325,317 | B2 | 6/2019 | Melton | |
| 10,326,862 | B2 | 6/2019 | Bonig | |
| 2006/0206407 | A1* | 9/2006 | Troxel, Jr. | G06Q 40/03 |
| | | | | 705/37 |
| 2007/0192230 | A1* | 8/2007 | Meacham | G06Q 40/04 |
| | | | | 705/37 |
| 2010/0017647 | A1* | 1/2010 | Callaway | G06F 11/1641 |
| | | | | 714/48 |
| 2010/0332650 | A1* | 12/2010 | Aisen | H04L 47/283 |
| | | | | 709/224 |
| 2015/0073970 | A1* | 3/2015 | Merold | G06Q 40/04 |
| | | | | 705/37 |
| 2015/0127516 | A1* | 5/2015 | Studnitzer | G06Q 40/06 |
| | | | | 705/37 |
| 2015/0161727 | A1* | 6/2015 | Callaway | G06F 21/6245 |
| | | | | 705/37 |
| 2016/0301587 | A1* | 10/2016 | Zheng | H04L 67/10 |
| 2018/0101842 | A1* | 4/2018 | Ventura | G06Q 10/087 |
| 2018/0167492 | A1* | 6/2018 | Bonig | G06Q 20/085 |

OTHER PUBLICATIONS

"Ajay Acharya, High Frequency Trading with Complex Event Processing, 2016" (Year: 2016).*

Extended European Search Report, from EP 20180185, Jul. 15, 2020, EP.

Examination Report from European Patent Application No. 20 180 185.9, dated Jan. 26, 2023, 10 pages.

* cited by examiner

LEAD MESSAGE OPERATOR

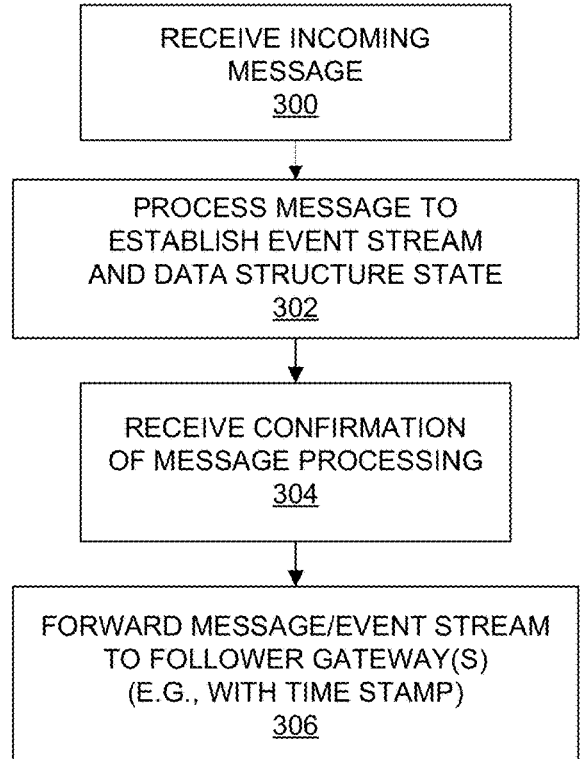

RECEIVE INCOMING
MESSAGE
300

PROCESS MESSAGE TO
ESTABLISH EVENT STREAM
AND DATA STRUCTURE STATE
302

RECEIVE CONFIRMATION
OF MESSAGE PROCESSING
304

FORWARD MESSAGE/EVENT STREAM
TO FOLLOWER GATEWAY(S)
(E.G., WITH TIME STAMP)
306

FIG. 3A

SHADOW MESSAGE OPERATOR

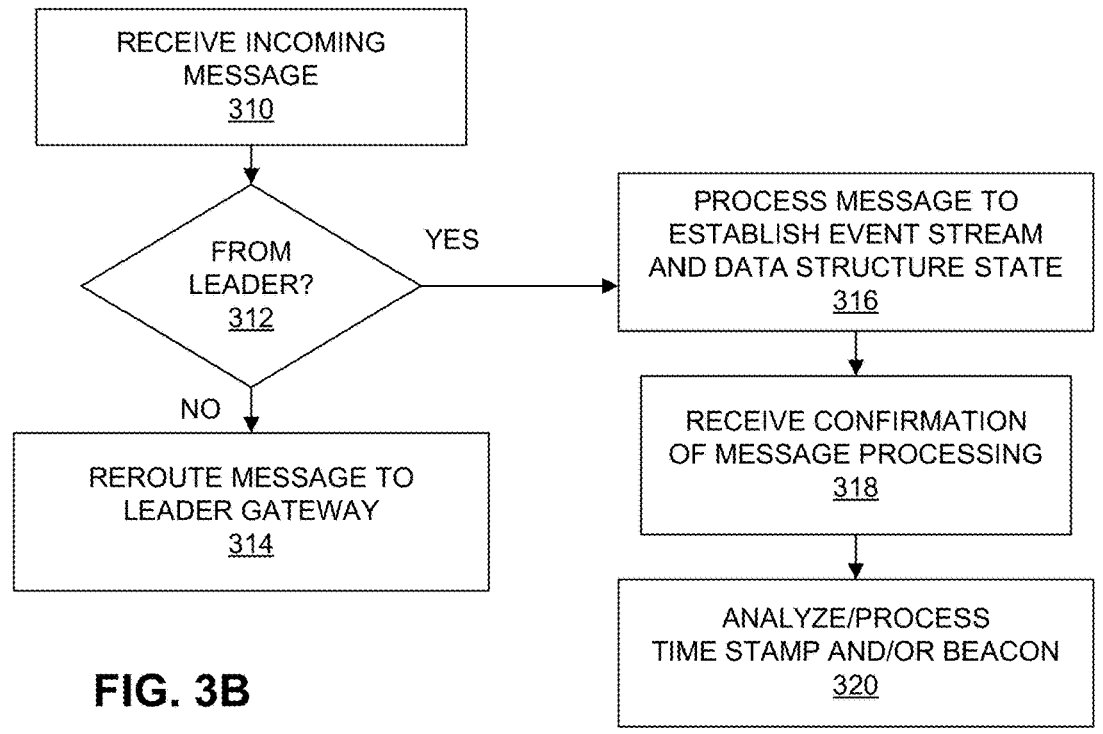

RECEIVE INCOMING
MESSAGE
310

FROM
LEADER?
312

YES

PROCESS MESSAGE TO
ESTABLISH EVENT STREAM
AND DATA STRUCTURE STATE
316

NO

REROUTE MESSAGE TO
LEADER GATEWAY
314

RECEIVE CONFIRMATION
OF MESSAGE PROCESSING
318

ANALYZE/PROCESS
TIME STAMP AND/OR BEACON
320

FIG. 3B

DETERMINISTIC MESSAGE PROCESSING IN A DISTRIBUTED NETWORK

BACKGROUND

A financial instrument trading system, such as a futures exchange, referred to herein also as an "Exchange", such as the Chicago Mercantile Exchange Inc. (CME), provides a contract market where financial products/instruments, for example futures and options on futures, are traded. Typically, the Exchange provides for a centralized "clearing house" through which all trades made must be confirmed, matched, and settled each day until offset or delivered. The clearing house is an adjunct to the Exchange, and may be an operating division thereof, which is responsible for settling trading accounts, clearing trades, collecting and maintaining performance bond funds, regulating delivery, and reporting trading data. The essential role of the clearing house is to mitigate credit risk. Clearing is the procedure through which the Clearing House becomes buyer to each seller of a futures contract, and seller to each buyer, also referred to as a novation, and assumes responsibility for protecting buyers and sellers from financial loss due to breach of contract, by assuring performance on each contract.

Current financial instrument trading systems allow traders to submit orders and receive confirmations, market data, and other information electronically via a network. These "electronic" marketplaces have largely supplanted the pit-based trading systems whereby the traders, or their representatives, all physically stand in a designated location, i.e. a trading pit, and trade with each other via oral and hand-based communication. In contrast to the pit-based trading system where like-minded buyers and sellers can readily find each other to trade, electronically submitted orders to buy and sell are then matched, if possible, by the Exchange, i.e. by the Exchange's matching engine, to execute a trade. Outstanding (unmatched, wholly unsatisfied/unfilled or partially satisfied/filled) orders are maintained in one or more data structures or databases referred to as "order books," such orders being referred to as "resting," and made visible, i.e., their availability for trading is advertised, to the market participants through electronic notifications/broadcasts, referred to as market data feeds. An order book is typically maintained for each product, e.g. instrument, traded on the electronic trading system and generally defines or otherwise represents the state of the market for that product, i.e. the current prices at which the market participants are willing buy or sell that product. As such, as used herein, an order book for a product may also be referred to as a market for that product.

A market data feed, referred to as market data or market feed, is a compressed or uncompressed real time (with respect to market events), or substantial approximation thereof, data/message stream provided by the Exchange directly, or via a third-party intermediary. A market data feed may be comprised of individual messages, each comprising one or more packets or datagrams, and may carry, for example, pricing or other information regarding orders placed, traded instruments and other market information, such as summary values and statistical values, or combinations thereof, and may be transmitted, e.g. multi-casted, to the market participants using standardized protocols, such as UDP over Ethernet. Pricing information conveyed by the market data feed may include the prices, or changes thereto, of resting orders, prices at which particular orders were recently traded, or other information representative of the state of the market or changes therein. Separate, directed/private, messages may also be transmitted directly to market participants to confirm receipt of orders, cancellation of orders and otherwise provide acknowledgment or notification of matching and other events relevant, or otherwise privy, only to the particular market participant.

As may be experienced by the market participants from outside the Exchange or electronic trading system operated thereby, the following sequence describes how, at least in part, information may be propagated in such a system and how orders may be processed: (1) An opportunity is created at a matching engine of the Exchange, such as by placing a recently received but unmatched order on the order book to rest; (2) The matching engine creates an update reflecting the opportunity and sends it to a feed engine; (3) The feed engine multicasts it to all of the market participants to advertise the opportunity to trade; (4) The market participants evaluate the opportunity and each, upon completion of their evaluation, may or may not choose to respond with an order responsive to the resting order, i.e. counter to the resting order; (5) The Exchange gateway receives any counter orders generated by the market participants, sends confirmation of receipt back directly to each submitting market participant, and forwards the received orders to the matching engine; and (6) The matching engine evaluates the received orders and matches the first arriving order against the resting opportunity and a trade is executed.

To gain and maintain the trust and confidence of market participants and encourage participation, electronic trading systems ideally attempt to offer a more efficient, fair and balanced market where market prices reflect a true consensus of the value of traded products among the market participants, and which minimize, if not eliminate, surreptitious or overt subversion, influence of, or manipulation by, any one or more market participants, intentional or otherwise, and unfair or inequitable advantages, with respect to access to information or opportunities. To accomplish these goals, for example, electronic trading systems should operate in a deterministic, i.e. a causal, predictable, or otherwise expected, manner as understood and experienced by the market participants, i.e. the customers of the Exchange. Electronic trading systems which implement markets which are overtly or covertly inefficient, unfair or inequitable risk not only losing the trust, along with the patronage, of market participants, but also increased regulatory scrutiny as well as potential criminal and/or civil liability.

Accordingly, high performance electronic trading systems need to assure transactional determinism under increasing loads while providing improved trading opportunities, fault tolerance, low latency processing, high volume capacity, minimal impact risk mitigation and market protections, as well as equitable access to information and opportunities.

BRIEF DESCRIPTION OF THE DRAWINGS

FIGS. 3A and 3B are flow diagrams of methods for controlling message processing in a distributed network in accordance with one example.

DETAILED DESCRIPTION

Figure 1:
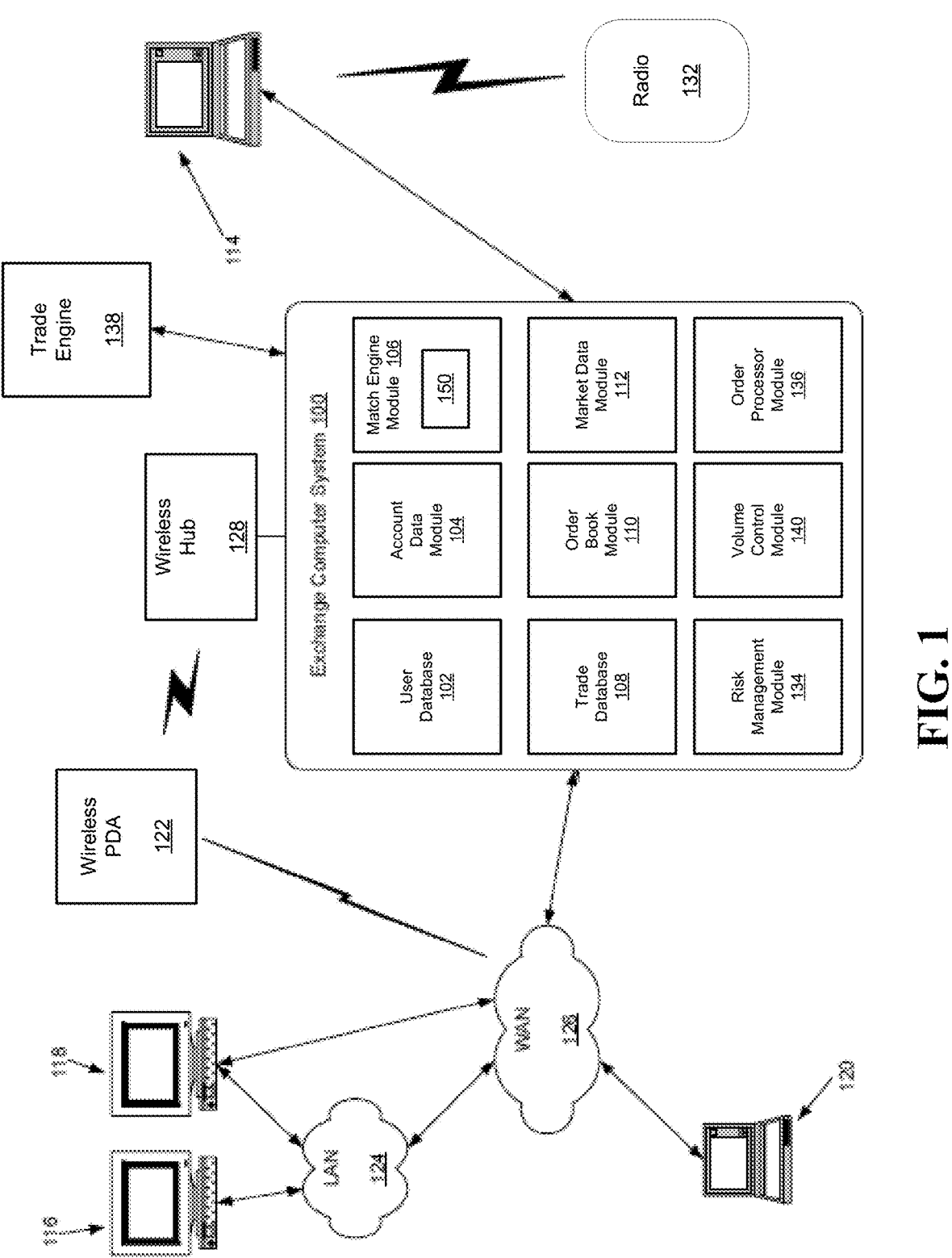
FIG. 1 depicts an illustrative computer system that may be used to implement aspects of the disclosed embodiments.

Systems and methods for controlling message processing in a distributed network are described. The systems and methods address technical problems in controlling message processing that arise from trading involving a set of match engines disposed in a distributed network. For instance, the distributed network may be arranged such that match engines are located in New York, London, and Tokyo. Electronic trading allows market participants to submit orders for a respective product to any one of the match engines. The disclosed systems and methods control the processing of such orders (or other messages) in those and other electronic trading scenarios so that the processing remains deterministic despite the multiple venues. In these and other ways, the disclosed systems and methods thus address the technical challenges presented by distributed, e.g., geographically distributed, computing systems.

The disclosed systems and methods support the synchronization of the order books in real time. At any one point in time during a day, one of the match engines is designated as a lead match engine. The lead match engine is responsible for matching orders for a respective product or a respective product group. The state of the order book maintained by the lead match engine is recreated in the other venues by forwarding the orders to follower or shadow match engines in the other venues. The shadow match engines are synchronized with the lead match engine because the orders are processed in the same order. The disclosed systems and methods thereby avoid having to rely on complex synchronization schemes or other order book replication techniques involving, for instance, large data transfers. Latency problems are therefore minimized or avoided.

The deterministic processing of the match engines of the disclosed systems and methods leads to the creation of the same order book in multiple venues. One venue, e.g., the venue in which a product is being actively traded, is designated as the lead venue. All orders for that product are routed through that match engine. The state of the order book maintained by that match engine is then recreated by one or more follower or shadow match engines in the other venues. To that end, the lead match engine establishes the order of the input stream, and sends the input stream to the other match engines, which then receive and process the same input stream of orders, in the same order, as the lead match engine, as described below. With each match engine being deterministic, and given the same input stream, all of the order books therefore reach the same state.

Recreation of the order book in each trading venue allows the roles of the match engines to be switched. For instance, as responsibility for a product transitions from one venue to another, e.g., due to market open and close times, the lead match engine may be switched from one match engine to another. The disclosed systems and methods allow the switch to be implemented essentially instantaneously because of the ongoing recreation of the order book. The switch may be achieved via an in-memory or other local switch. An extended delay involving data transfers between venues are therefore avoided.

The disclosed embodiments are useful in connection with any security, derivative, or other financial product traded via any equity, options or futures trading system, e.g., exchange, Electronic Communication Network ("ECN"), Alternative Trading System ("ATS"), or market now available or later developed, e.g. cash, Futures, etc., as well as any instrument traded thereon. The disclosed embodiments may thus be used in connection with a variety of different trading environments, such as an exchange as described herein, or other environments that implement one or more economic markets where rights and obligations may be traded.

The disclosed embodiments are also not limited to the processing of financial products. The disclosed embodiments may be used in connection with any type of input message stream for which deterministic processing is useful. The incoming messages may thus be used to establish the state of data structures directed to various types of content.

The trading environment to which the disclosed embodiments are applied may be characterized by a need to maintain market integrity, transparency, predictability, fair/ equitable access and participant expectations with respect thereto. For example, an exchange must respond to inputs, such as trader orders, cancellation, etc., in a manner as expected by the market participants, such as based on market data, e.g. prices, available counter-orders, etc., to provide an expected level of certainty that transactions will occur in a consistent and predictable manner and without unknown or unascertainable risks. In addition, it will be appreciated that electronic trading systems further impose additional expectations and demands by market participants as to transaction processing speed, latency, capacity and response time, while creating additional complexities relating thereto. Accordingly, as will be described, the disclosed embodiments may further include functionality to ensure that the expectations of market participants are met, e.g. that transactional integrity and predictable system responses are maintained.

As was discussed above, electronic trading systems ideally attempt to offer an objective, efficient, fair and balanced market where market prices reflect a true consensus of the value of products traded among the market participants, where the intentional or unintentional influence of human interaction is minimized, if not eliminated, and where unfair or inequitable advantages with respect to information access are minimized if not eliminated.

These and other aspects of the electronic trading environment present technical challenges and other problems that are addressed by the disclosed embodiments. For instance, the technical problem of trading venue synchronization exclusively arises from the computerized and distributed nature of electronic trading.

A brief introduction to matching is now provided. Some products on an exchange are traded on an electronic trading platform (e.g., an electronic exchange), also referred to herein as a trading platform, trading host or Exchange Computer System, where market participants, e.g. traders, use software to send orders to the trading platform. The order identifies the product, the quantity of the product the trader wishes to trade, a price at which the trader wishes to trade the product, and a direction of the order (i.e., whether the order is a bid, i.e., an offer to buy, or an ask, i.e., an offer to sell). The Exchange Computer System, as will be described below, monitors incoming orders received thereby and attempts to identify, i.e., match or allocate, one or more previously received, but not yet matched, orders, i.e., limit orders to buy or sell a given quantity at a given price, referred to as "resting" orders, stored in an order book database, where each identified order is contra to the incoming order and has a favorable price relative to the incoming order. An incoming order may be an "aggressor" order, i.e., a market order to sell a given quantity at whatever may be the resting bid order price(s) or a market order to buy a given quantity at whatever may be the resting ask order price(s). In particular, if the incoming order is a bid, i.e., an offer to buy, then the identified order(s) will be an ask, i.e., an offer to sell, at a price that is identical to or lower than the bid price. Similarly, if the incoming order is an ask, i.e., an offer to sell, the identified order(s) will be a bid, i.e., an order to buy, at a price that is identical to or higher than the offer price.

Upon identification (matching) of a contra order(s), a minimum of the quantities associated with the identified order and the incoming order is matched and that quantity of each of the identified and incoming orders becomes two halves of a matched trade that is sent to a clearinghouse. The Exchange Computer System considers each identified order in this manner until either all of the identified orders have been considered or all of the quantity associated with the incoming order has been matched, i.e., the order has been filled. If any quantity of the incoming order remains, an entry may be created in the order book database and information regarding the incoming order is recorded therein, i.e., a resting order is placed on the order book for the remaining quantity to await a subsequent incoming order counter thereto.

Traders access the markets on a trading platform using trading software that receives and displays at least a portion of the order book for a market, i.e., at least a portion of the currently resting orders. The trading software enables a trader to provide parameters for an order for the product traded in the market, and transmits the order to the Exchange Computer System. The trading software typically includes a graphical user interface to display at least a price and quantity of some of the entries in the order book associated with the market. The number of entries of the order book displayed is generally preconfigured by the trading software, limited by the Exchange Computer System, or customized by the user. Some graphical user interfaces display order books of multiple markets of one or more trading platforms. The trader may be an individual who trades on his/her behalf, a broker trading on behalf of another person or entity, a group, or an entity. Furthermore, the trader may be a system that automatically generates and submits orders.

The disclosed systems and methods are compatible with any matching procedure or algorithm. Different products offered by a particular Exchange may use different matching algorithms. The manner in which orders are prioritized in the order book and/or allocated may thus vary. It will be appreciated that there may be other allocation algorithms, including combinations of algorithms, now available or later developed, which may be utilized in conjunction with the disclosed embodiments, and all such algorithms are contemplated herein.

The manner in which the match engines of the disclosed systems are deterministic may vary. Examples of deterministic exchange computer systems for electronic trading are described in U.S. Pat. No. 9,691,102, the entire disclosure of which is hereby incorporated by reference. Other match engines and exchange computer systems may be used.

FIG. 1 depicts a trading network environment in accordance with one example. In this case, an exchange computer system 100 receives orders and transmits market data related to orders and trades to users, such as via wide area network 126 and/or local area network 124 and computer devices 114, 116, 118, 120 and 122, as will be described below, coupled with the exchange computer system 100.

Each trading venue of the systems described herein may be configured in accordance with the exchange computer system 100 of FIG. 1. For instance, the disclosed systems may have multiple exchange computer systems coupled with one another via a distributed network. Further details regarding the disclosed systems are provided in connection with the example of FIG. 2.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herein unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The exchange computer system 100 may be implemented with one or more mainframe, desktop or other computers, such as the computer 400 described below with respect to FIG. 4. A user database 102 may be provided which includes information identifying traders and other users of exchange computer system 100, such as account numbers or identifiers, user names and passwords. An account data module 104 may be provided, which may process account information that may be used during trades and/or credit control, as described below. A match engine module 106 may be included to match bid and offer prices and may be implemented with software that executes algorithms for matching bids and offers, in conjunction with controlling credit, as will be described in more detail below in connection with FIGS. 2 and 3. A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission to users. A risk management module 134 may be included to compute and determine a user's risk utilization in relation to the user's defined risk thresholds. An order processing module 136 may be included to decompose delta based and bulk order types for processing by the order book module 110 and/or match engine module 106. A volume control module 140 may be included to, among other things, control the rate of acceptance of mass quote messages in accordance with one or more aspects of the disclosed embodiments. It will be appreciated that concurrent processing limits may be defined by or imposed separately or in combination, as was described above, on one or more of the trading system components, including the user database 102, the account data module 104, the match engine module 106, the trade database 108, the order book module 110, the market data module 112, the risk management module 134, the order processing module 136, or other component of the exchange computer system 100.

The trading network environment shown in FIG. 1 includes example computer devices 114, 116, 118, 120 and 122 which depict different example methods or media by which a computer device may be coupled with the exchange computer system 100 or by which a user may communicate, e.g. send and receive, trade or other information therewith. It will be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 400 described in more detail below with respect to FIG. 4, may include a central processor that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An example computer device 114 is shown directly connected to exchange computer system 100, such as via a T1 line, a common local area network (LAN) or other wired and/or wireless medium for connecting computer devices, such as the network 420 shown in FIG. 4 and described below with respect thereto. The example computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the example computer device 114 or a user thereof. The user of the example computer device 114, or the example computer device 114 alone and/or autonomously, may then transmit the trade or other information to the exchange computer system 100.

Example computer devices 116 and 118 are coupled with the local area network ("LAN") 124, which may be configured in one or more of the well-known LAN topologies, e.g. star, daisy chain, etc., and may use a variety of different protocols, such as Ethernet, TCP/IP, etc. The example computer devices 116 and 118 may communicate with each other and with other computer and other devices, which are coupled with the LAN 124. Computer and other devices may be coupled with the LAN 124 via twisted pair wires, coaxial cable, fiber optics or other wired or wireless media. As shown in FIG. 1, an example wireless personal digital assistant device ("PDA") 122, such as a mobile telephone, tablet-based computer device, or other wireless device, may communicate with the LAN 124 and/or the Internet 126 via radio waves, such as via WiFi, Bluetooth and/or a cellular telephone-based data communications protocol. The PDA 122 may also communicate with exchange computer system 100 via a conventional wireless hub 128.

FIG. 1 also shows the LAN 124 coupled with a wide area network ("WAN") 126 which may be comprised of one or more public or private wired or wireless networks. In one embodiment, the WAN 126 includes the Internet 126. The LAN 124 may include a router to connect LAN 124 to the Internet 126. Example computer device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 420 shown in FIG. 4 and described below with respect thereto.

As was described above, the users of the exchange computer system 100 may include one or more market makers that may maintain a market by providing constant bid and offer prices for a derivative, security, or other financial product to the exchange computer system 100, such as via one of the example computer devices depicted. The exchange computer system 100 may also exchange information with other trade engines, such as trade engine 138.

The trading environment may include any number of additional match engines. The additional match engines may support trading activities in venues geographically remote from the exchange computer system 100. For instance, the additional match engines may be located in Tokyo and London, respectively, while the match engine module 106 is located in New York. The additional match engines are coupled with the above-described components of the exchange computer system via the Internet 126 and/or other distributed network. The additional match engines may thus be considered to be components of the exchange computer system 100. In such cases, the additional match engines may or may not rely on one or more of the other components of the exchange computer system 100 to support the trading activities in the other venues. In other cases, one or more components of the exchange computer system 100 may be replicated in the other trading venues. Additional details regarding the multiplicity of match engines are provided below in connection with the example of FIG. 2.

The operations of computer devices and systems shown in FIG. 1 may be controlled by computer-executable instructions stored on a computer-readable storage medium (as opposed to computer-readable communication media involving propagating signals) or a non-transitory computer-readable storage medium. For example, the example computer device 116 may include computer-executable instructions for receiving order information from a user and transmitting that order information to exchange computer system 100. In another example, the example computer device 118 may include computer-executable instructions for receiving market data from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

Figure 2:
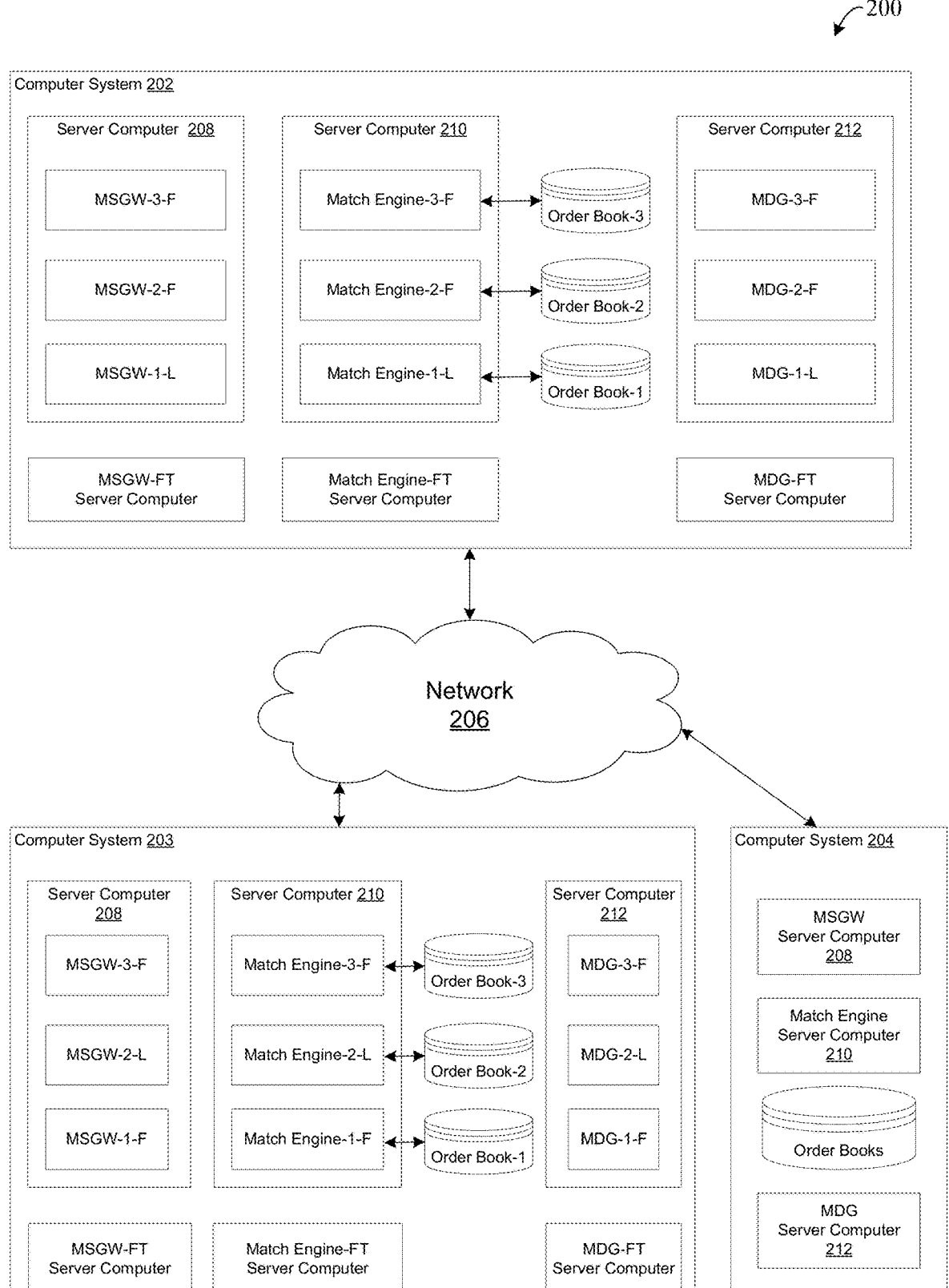
FIG. 2 is a block diagram of a system for controlling message processing in a distributed network in accordance with one example.

FIG. 2 depicts a system 200 having multiple computer systems 202-204 for receiving and processing orders or other messages. Each computer system 202-204 may be configured as an exchange computer system, such as the exchange computer system 100 of FIG. 1, or another message processing computer system. Each computer system 202-204 may include any number of the components of the exchange computer system 100 described above. Additional or fewer computer systems may be included. For instance, the system 200 may include a computer system for each venue, data center, or other location at which orders are accepted.

The computer systems 202-204 may, for instance, correspond with the match engine and other exchange computer system components located in New York, London, and Tokyo, respectively. Thus, for instance, the computer systems 202-204 may be physically located at the New York, London, and Tokyo venues, respectively.

In the example of FIG. 2, the computer systems 202-204 are configured similarly, but may include differences in other cases. For instance, one or more of the computer systems 202-204 may have a lower number of order books and match engines than the other computer systems if, for instance, trading in certain products does not transition to a certain venue.

The computer systems 202-204 are coupled to one another in or via a distributed network 206. The network 206 may be or include the internet, but any communication network may be used. The network 206 may or may not include dedicated connections between the computer systems 202-204. The characteristics of the network 206 may thus vary.

Each computer system 202-204 includes at least one processor and at least one memory in which computer-executable instructions are stored. In the example of FIG. 2, each computer system 202-204 includes a set of server computers 208, 210, 212, each having one or more processors. The server computer 208 is directed to message gateway functionality. The server computer 210 is directed to match engine or other message processing functionality. Together, the server computers 208, 210 provide a message operator configured to process incoming messages to manage a data structure having a state determined via processing of the messages. In the example of FIG. 2, the data structures of each computer system 202-204 are order book databases. The server computer 212 is directed to market data generation or other publication functionality.

Each server computer 208, 210, 212 implements multiple logical components for a respective function, one for each venue. Each logical component thus corresponds with one of the venues in which messages may be received and processed. In this example, there are three venues. So, in the example of FIG. 2, each server computer 208 has three message gateway components MSGW-1, MSGW-2, and MSGW3. In some examples, such as examples involving messages regarding financial products, the message gateway components may be configured as market segment gateway (MSGW) components. Similarly, each server computer 210 has three message processing components, Match Engine-1, Match Engine-2, and Match Engine 3. Each match engine component controls a corresponding order book or other data structure. Each server computer 212 has three publication generators (e.g., market data generation components) MDG-1, MDG-2, and MDG-3. Each publication generator MDG-1, MDG-2, and MDG-3 is configured to generate a publication indicative of the current state of the data structure.

The numerals (1, 2, or 3) appended to each component designate the venue with which the component is associated. For instance, the numeral 1 may correspond with the New York venue at which the computer system 202 is located. The numeral 2 may correspond with the London venue at which the computer system 203 is located. The numeral 3 may correspond with the Tokyo venue at which the computer system 204 is located.

The components of each server computer 208, 210, 212 are also labeled with an "L" or "F" to designate the roles assigned thereto. The components labeled with an "L" are acting as a leader. The components labeled with an "F" are acting as a follower. The components in follower roles may be referred to as "shadow" components.

The leader and follower roles may differ from the example shown. In electronic trading examples, the roles are assigned on a product-by-product basis. More generally, the roles may be assigned by an area, subject, or other field (e.g., market or product) to which the events presented by the messages pertain.

With regard to a trading example, one of the match engines is designated as the lead match engine for each product. The assignment may change throughout a given trading day, i.e., as the day progresses. For instance, a currency pair (e.g., US Dollar-Yen) may be actively traded in one trading venue (e.g., New York) during certain hours of the day, and another trading venue (e.g., Tokyo) during other hours. The location or venue in which a product is actively traded may be designated as the lead venue, but the manner in which the leader role is assigned may vary. Each of the other venues is assigned a follower role for that particular product. At any one point in time, any one venue may be a leader for some products, and a follower for other products.

The orders or other messages may be received at any of the venues, i.e., computer systems 202-204. For example, a trader may connect to any one of the computer systems 202-204 to submit an order. Thus, a message may arrive at a server computer 208 that is acting in a follower role for the particular product to which the order is directed. The gateway and other message operation functionality of the server computers 208, 210, 212 accordingly varies in connection with whether the message arrives at a leader or follower, as described below.

The message operator of a computer system acting in a follower role is configured to reroute unprocessed messages received thereby to the message operator of the computer system assigned the leader role. As a result, the message operator of the computer system assigned the leader role processes an input message stream for the messages to which it is assigned the leader role, establishes an order of the input message stream, and processes the input message stream to establish a current state of the data structure arising from the input message stream. For example, the venue associated with the computer system 202 is assigned the leader role for a US Dollar-Yen currency product. The message gateway MSGW-1-L is therefore assigned the leader role for that product. The message gateways in the other computer systems 203, 204 act as followers, i.e., labeled MSGW-1-F. Each message gateway MSGW-1-F of the computer systems 203, 204 will accordingly reroute orders for that product to the message gateway MSGW-1-L of the computer system 202. With all incoming orders for the product rerouted to the message gateway MSGW-1-L of the computer system 202, the message gateway MSGW-1-L of the computer system 202 establishes the order for the input message stream for that product, and the match engine-1-L of the computer system 202 processes the input message stream to establish the current state of the Order Book-1 for that product.

Once the current state of the order book is established, the message operator of the computer system assigned the leader role is configured to send the messages of the input message stream to the message operator of each computer system acting in a follower role. For instance, in the example shown, the message gateway MSGW-1-L is configured to send the input message stream to the message operators of the other computer systems 203, 204 once the match engine 1-L confirms that the input message stream has been processed to establish the current state of the data structure. The messages of the input message stream are sent in accordance with the order established by the leader. As a result, the current state of data structure is recreated by the message operator of each computer system acting in a follower role. In the currency product example introduced above, the message gateway-1-L of the computer system 202 forwards each order for the currency product to the message gateways MSGW-1-F of the other two computer systems 203, 204. The input message stream is therefore replicated at the other two message gateways MSGW-1-F. With the same input stream, the order books of the other two computer systems 203, 204 reach the same state as the order book of the computer system 202 because each match engine is deterministic.

The architecture of the system 200 thus allows a customer to connect to, and submit an order or other message to, the computer system 202, which may correspond with a venue in New York. If New York is the lead venue for that product (or other field), the message operator in New York establishes the sequencing of the message stream and the state of the order book (or other data structure). The order is then later shared with the follower or shadow message operators in the computer systems in the other venues, such as London and Tokyo, for processing. In this way, the state of the order book of the lead message operator is recreated in the order books of the shadow message operators. All of the message operators are therefore synchronized in real time (e.g., as the incoming messages arrive).

The synchronization allows a simple, in-memory (i.e. extremely fast) switch to transition the leader role from one venue to another. Thus, when trading in venue is done (e.g., the Asian markets close), a quick operation may be implemented to assign the leader role to a computer system in another venue, such as London.

The synchronization also supports the publication functionality of the publication generators MDG-1, MDG-2, and MDG-3. The synchronization allows the shadow (or follower) publication generators to publish the same market data as the lead publication generator without having to rely on large dataset transfers therebetween to, e.g., replicate the data of the publication. Customers receiving the market data or other publication thus receive the same publication regardless of the market data generation component (or other publication generator) to which they subscribe or connect. Instead of replicating and transferring the publication, the synchronization of the state of the data structure allows the same publication to be generated at each follower publication generator MDG-F. Once the data structure in each follower region reaches the same state as the leader, the same market data or other publication is generated.

The publication may be triggered via one or more time beacons or other time stamps in the messages sent by the leader message operator. For example, the message operator may incorporate a time stamp into each one of the messages of the input message stream when sending the messages to the other message operators. Each follower publication generator is then configured to use the time stamp to determine whether to include the message in the publication. In some cases, the determination is made based on a time beacon sent by the lead message operator. For example, the time beacon may be indicative of a time at which the publication is generated by the lead publication generator. Each follower publication generator is then configured to determine whether to include a particular message in the publication based on whether the time stamp of the message precedes the time beacon.

The synchronization may also be useful in supporting real-time disaster recovery. The ability to switch the leader and follower roles may be used to address a catastrophe in one venue, such as a data center going down. If one venue becomes unavailable, the message operators in one of the other computer systems may be assigned the leader role.

The synchronization may also allow the hardware footprint of the system 200 to be minimized or reduced. In the example of FIG. 2, a total of six server computers provide fault tolerant functionality. The use of a single server computer to provide the functionality for all of, for instance, the gateway functionality, in all of the venues of the system 200, avoids an architecture in which separate server computers are provided for replicating each gateway.

In the example of FIG. 2, each computer system 202-204 also includes a set of server computers that replicate the processing of the server computers 208, 210, 212 for fault tolerance. A separate server computer may be provided for each function, as shown. The manner in which fault tolerance is provided may vary.

FIG. 3A depicts a computer implemented method for message processing in a distributed network. The method may show an example of the operation of a lead message operator in the system 200 of FIG. 2, or another system.

The method may begin with receiving an incoming message [block 300]. For example, an order may be received at a message gateway. The received incoming message is then processed to establish an order of an input message stream and to manage a first data structure having a state deterministically established via processing of the input message stream [block 302]. For example, the incoming order may be processed by a match engine to manage an order book. In some cases, the message operator receives confirmation of such message processing [block 304]. Once the processing is complete and the state is established (e.g., confirmation received), the input message stream is forwarded to follower message operators at the other venues in accordance with the established order [block 306]. For example, the order is forwarded to each follower gateway. Forwarding the messages to each follower gateway in accordance with the established order results in recreation of the state in the order book or other data structure managed by each shadow message operator. The same state is reached in each message operator because the same input message stream is applied to all of the message operators, each of which is deterministic.

In some cases, the message is forwarded with a time stamp. The market data generation component or other publication generator of the follower computer system may then use the time stamp to determine whether and when to include the message in a publication.

FIG. 3B depicts a computer implemented method for message processing in a distributed network. The method may show an example of the operation of a shadow message operator in the system 200 of FIG. 2, or another system.

The method may begin with receiving an incoming message [block 310]. A decision block 312 then determines if the incoming message is from the lead message operator. If not, then the message is rerouted to the lead message operator for processing to establish an order of an input message stream and to manage a lead data structure having a state deterministically established via processing of the input message stream, as described above [block 314]. If the incoming message is from the lead message operator, then the incoming message is processed to manage a shadow data structure in accordance with the established order to recreate the state of the lead data structure established as a result of processing of the input message stream by the lead message operator [block 316]. In some cases, confirmation of the processing is then received [block 318].

In cases in which a time stamp is included in the message, the time stamp may be analyzed to determine whether and when to generate a publication of, e.g., the state of the data structure [block 320]. In some cases, the determination is made in accordance with a time beacon that indicates when the lead publication generator has generated the publication (e.g., at every 10 ms interval). In this way, the same publication is generated in each region or venue without having to rely on replicating the data underlying the publication via, e.g., large file transfers. In examples involving financial products, the market data generator in each region publishes the same market data packet.

Figure 4:
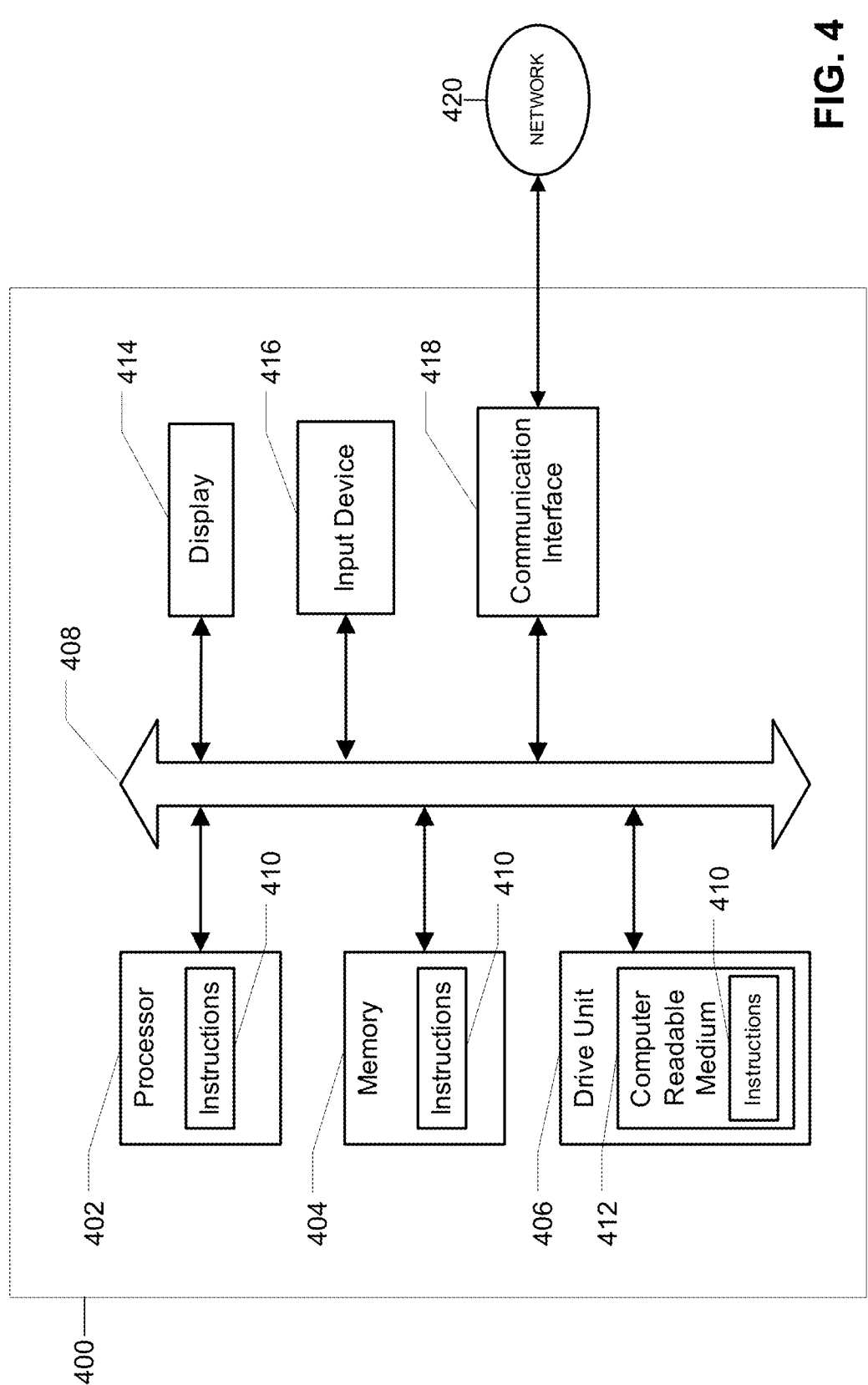
FIG. 4 shows an illustrative embodiment of a general computer system for use in or with the examples of FIGS. 1-3.

Each act of the above-described methods is implemented by a processor, such as the processor in the example of FIG. 4, a processor of the exchange computer system 100 in the example of FIG. 1, and/or another processor. The processor may include any number of processors, such as processing cores or units, and may be disposed in any arrangement.

The order of the acts or steps of the operation may vary from the example shown. For example, the acts may be implemented concurrently for different incoming messages. Additional, fewer, or alternative acts may be implemented. For example, the methods may not include acts directed to message processing confirmation.

Referring to FIG. 4, an illustrative embodiment of a general computer system 400 is shown. The computer system 400 can include a set of instructions that can be executed to cause the computer system 400 to perform any one or more of the methods or computer-based functions disclosed herein. The computer system 400 may operate as a standalone device or may be connected, e.g., using a network, to other computer systems or peripheral devices. Any of the components discussed above may be a computer system 400 or a component in the computer system 400. The computer system 400 may implement a match engine on behalf of an exchange, such as the Chicago Mercantile Exchange Inc., of which the disclosed embodiments are a component thereof.

In a networked deployment, the computer system 400 may operate in the capacity of a server or as a client user computer in a client-server user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. The processor 402 may be a component in a variety of systems. For example, the processor 402 may be part of a standard personal computer or a workstation. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

The computer system 400 may include a memory 404 that can communicate with a drive unit 406 and other components of the system 400 via a bus 408. The memory 404 may be a main memory, a static memory, or a dynamic memory. The memory 404 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 404 includes a cache or random access memory for the processor 402. In alternative embodiments, the memory 404 is separate from the processor 402, such as a cache memory of a processor, the system memory, or other memory. The memory 404 may be an external storage device or database for storing data. Examples include a hard drive, compact disc ("CD"), digital video disc ("DVD"), memory card, memory stick, floppy disk, universal serial bus ("USB") memory device, or any other device operative to store data.

The memory 404 is operable to store instructions 410 executable by the processor 402. The functions, acts or tasks illustrated in the figures or described herein may be performed by the programmed processor 402 executing the instructions 410 stored in the memory 404. The instructions 410 may be loaded or accessed from a computer-readable storage medium 412 in the drive unit 406 or other data storage device. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 400 may further include a display unit 414, such as a liquid crystal display (LCD), an organic light emitting diode (OLED), a flat panel display, a solid state display, a cathode ray tube (CRT), a projector, a printer or other now known or later developed display device for outputting determined information. The display 414 may act as an interface for the user to see the functioning of the processor 402, or specifically as an interface with the software stored in the memory 404 or in the drive unit 406.

Additionally, the computer system 400 may include an input device 416 configured to allow a user to interact with any of the components of system 400. The input device 416 may be a number pad, a keyboard, or a cursor control device, such as a mouse, or a joystick, touch screen display, remote control or any other device operative to interact with the system 400.

In a particular embodiment, as depicted in FIG. 4, the computer system 400 may also include an optical or other disk drive unit as the drive unit 406. The disk drive unit 406 may include the computer-readable storage medium 412 in which one or more sets of instructions 410, e.g. software, can be embedded. Further, the instructions 410 may embody one or more of the methods or logic as described herein. In a particular embodiment, the instructions 410 may reside completely, or at least partially, within the memory 404 and/or within the processor 402 during execution by the computer system 400. The memory 404 and the processor 402 also may include computer-readable storage media as discussed above.

The present disclosure contemplates a computer-readable medium that includes instructions 410 or receives and executes instructions 410 responsive to a propagated signal, which may be received via a communication interface 418. The system 400 may be connected to a network 420 to communicate voice, video, audio, images or any other data over the network 420. Further, the instructions 412 may be transmitted or received over the network 420 via a communication interface 418. The communication interface 418 may be a part of the processor 402 or may be a separate component. The communication interface 418 may be created in software or may be a physical connection in hardware. The communication interface 418 is configured to connect with a network 420, external media, the display 414, or any other components in system 400, or combinations thereof. The connection with the network 420 may be a physical connection, such as a wired Ethernet connection or may be established wirelessly as discussed below. Likewise, the additional connections with other components of the system 400 may be physical connections or may be established wirelessly.

The network 420 may include wired networks, wireless networks, or combinations thereof. The wireless network may be a cellular telephone network, an 802.11, 802.16, 802.20, or WiMax network. Further, the network 420 may be a public network, such as the Internet, a private network, such as an intranet, or combinations thereof, and may utilize a variety of networking protocols now available or later developed including, but not limited to TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the terms "computer-readable medium" and "computer-readable storage medium" include a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer-readable storage medium may be or include a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, example embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an example, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

The disclosed computer programs (also known as a program, software, software application, script, or code) can be written in any form of programming language, including compiled or interpreted languages. The disclosed computer programs can be deployed in any form, including as a standalone program or as a module, component, subroutine, or other unit suitable for use in a computing environment. Such computer programs do not necessarily correspond to a file in a file system. Such programs can be stored in a portion of a file that holds other programs or data (e.g., one or more scripts stored in a markup language document), in a single file dedicated to the program in question, or in multiple coordinated files (e.g., files that store one or more modules, sub programs, or portions of code). Such computer programs can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor may receive instructions and data from a read only memory or a random access memory or both. The essential elements of a computer are a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical discs; and CD ROM and DVD-ROM discs. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing description be regarded as illustrative rather than limiting, and that it be understood that it is the following claims, including all equivalents, that are intended to define the spirit and scope of this invention.

What is claimed is:

1. A system for message processing in a distributed network, the system comprising:

first and second computer systems coupled to one another in the distributed network, each of the first and second computer systems comprising at least one processor and at least one memory in which computer-executable instructions are stored that, when executed by the at least one processor, implement a message operator configured to process messages arriving at the message operator to manage a data structure having a state deterministically established via processing of the messages;

wherein the message operator of the first computer system is configured to, prior to attempting to process unprocessed messages, reroute the unprocessed messages received by the message operator of the first computer system to the message operator of the second computer system;

wherein the message operator of the second computer system is configured to establish, based on the rerouted unprocessed messages, an order of an input message stream and process the input message stream in the order to establish a current state of the data structure arising from ordered processing of the input message stream, wherein the message operator of the second computer system is configured to, once the current state is established, send the input message stream to the message operator of the first computer system in accordance with the established order;

wherein the message operator of the first computer system is configured to recreate, via reception and processing of the input message stream in the order, the current state of the data structure, wherein the message operators of the first and second computer systems are deterministic such that the processing of the input message stream by the message operators is deterministic, and wherein the deterministic processing of the message operators of the first and second computer systems causes the data structures for the first and second computer systems to reach a same state given that both of the message operators process the input message stream in the established order.

2. The system of claim 1, wherein each message is representative of an event such that the input message stream is representative of an input message event stream.

3. The system of claim 1, wherein each message operator comprises a message gateway configured to receive and transmit the messages, and further comprises an event processing engine configured to manage the data structure in accordance with the messages received by the message gateway.

4. The system of claim 3, wherein:

each of the first and second computer systems comprises a plurality of server computers;

the message gateway is implemented on a first server computer of the plurality of server computers; and the event processing engine is implemented on a second server computer of the plurality of server computers.

5. The system of claim 3, wherein the message gateway of the message operator of the second computer system is configured to send the messages of the input message stream to the message operator of the first computer system once the event processing engine confirms processing of the messages of the input message stream to establish the current state of the data structure.

6. The system of claim 1, wherein:

the message operator of each of the first and second computer systems is a first message operator of a plurality of message operators implemented on each of the first and second computer systems;

the first message operators are configured to process messages regarding events in a first field; and second message operators of the plurality of message operators implemented on each of the first and second computer systems are configured to process messages regarding events in a second field.

7. The system of claim 1, wherein:

the message operator of the second computer system implements a leader role for the message processing, and the message operator of the first computer system implements a follower role for the message processing; and the message operator of the second computer system switches assignment of the leader role and the follower role upon notification of the message operator of the first computer system.

8. The system of claim 7, wherein the assignment is switched via an in-memory designation associating the message operator as implementing either the leader role or the follower role.

9. The system of claim 7, wherein the assignment of the leader role is made in accordance with which of the first and second computer systems is associated with a lead venue for the input message stream.

10. The system of claim 9, wherein each message is an order for a financial product such that the active venue corresponds with a venue at which the financial product is actively trading.

11. The system of claim 1, wherein:

execution of the computer-executable instructions further implements a publication generator of each of the first and second computer systems, the publication generator being configured to generate a publication indicative of the current state of the data structure;

the message operator of the second computer system incorporates a time stamp into each one of the messages of the input message stream when sending the messages to the message operator of the first computer system;

the publication generator of the first computer system is configured to use the time stamp to determine whether to include the message in the publication.

12. The system of claim 11, wherein:

the message operator of the second computer system is configured to send a time beacon indicative of a time at which the publication is generated;

the publication generator of the first computer system is configured to determine whether to include the message in the publication based on whether the time stamp of the message precedes the time beacon.

13. The system of claim 11, wherein the publication generator is implemented on a further server computer of each of the first and second computer systems.

14. A computer implemented method of message processing in a distributed network, the method comprising:

receiving, by a first message operator comprising at least one processor, an incoming message;

processing, by the first message operator, the received incoming message to establish an order of an input message stream and manage a first data structure having a state deterministically established via processing of the input message stream; and forwarding, by the first message operator via the distributed network, regardless of whether the first message is matched by the processing and once the state is established, the input message stream to a second message operator in accordance with the established order for processing of the input message stream;

recreating, via reception and processing of the input message stream, the state in a second data structure managed by the second message operator;

wherein the first and second message operators are deterministic, the processing of the input message stream by the first and second message operators being deterministic based on the first and second message operators being deterministic, and wherein, after the deterministic processing of the first and second message operators, the first and second data structures having a same state given that both of the first and second message operators process the input message stream in the established order.

15. The method of claim 14, further comprising receiving, by a message gateway of the first message operator, confirmation of the processing of the message by an event processing engine of the first message operator, wherein forwarding the message is implemented after the confirmation is received.

16. The method of claim 14, wherein forwarding the message comprises forwarding the message with a time stamp, the second message operator being configured to use the time stamp for generation of a publication indicative of the state of the data structure.

17. The method of claim 14, wherein the message regards events in a first field, and wherein the method includes reversing roles of the first and second message operators for messages regarding events in a second field relative to roles of first and second message operators for messages regarding events in the first field.

18. A computer implemented method of message processing in a distributed network in which a lead message operator and a shadow message operator are disposed, each of the lead message operator and the shadow message operator comprising at least one processor, the method comprising:

receiving, by the shadow message operator, an incoming message;

at a time that the incoming message is not from the lead message operator and prior to attempting to process the incoming message, rerouting the incoming message to the lead message operator for processing to establish an order of an input message stream and to manage a lead data structure having a state deterministically established via processing of the input message stream;

at a time that the incoming message is from the lead message operator, processing, by the shadow message operator, the incoming message to manage a shadow data structure in accordance with the established order to recreate the state of the lead data structure established as a result of processing of the input message stream by the lead message operator;

wherein the lead and shadow message operators are deterministic, the processing of the input message stream by the lead and shadow message operators being deterministic based on the lead and shadow message operators being deterministic, and wherein, after the deterministic processing of the lead and shadow message operators, the lead and shadow data structures having a same state given that both of the lead and shadow message operators process the input message stream in the established order.

19. The method of claim 18, further comprising, at a time that the incoming message is from the lead message operator, analyzing a timestamp in the message to determine when to generate a publication indicative of the state of the shadow data structure.

20. The method of claim 18, wherein the incoming message regards events in a first field, and wherein roles of the lead and shadow message operators are reversed for messages regarding events in a second field.

* * * * *